United States Patent
Van Wagoner et al.

(10) Patent No.: US 7,925,481 B2
(45) Date of Patent: Apr. 12, 2011

(54) GEOLOGIC MODELS OF SUBSURFACE SEDIMENTARY VOLUMES

(76) Inventors: John C. Van Wagoner, Houston, TX (US); Paul A. Dunn, Houston, TX (US); Max Deffenbaugh, Califon, NJ (US); David N. Awwiller, Houston, TX (US); Tao Sun, Missouri City, TX (US); Dachang Li, Katy, TX (US); David C. Hoyal, Houston, TX (US); Chris J. Donofrio, The Woodlands, TX (US)

( * ) Notice: Subject to any disclaimer, the term of this patent is extended or adjusted under 35 U.S.C. 154(b) by 1008 days.

(21) Appl. No.: 11/658,922

(22) PCT Filed: Aug. 19, 2005

(86) PCT No.: PCT/US2005/029753
§ 371 (c)(1),
(2), (4) Date: Jan. 30, 2007

(87) PCT Pub. No.: WO2006/031383
PCT Pub. Date: Mar. 23, 2006

(65) Prior Publication Data
US 2009/0204377 A1    Aug. 13, 2009

Related U.S. Application Data

(60) Provisional application No. 60/609,057, filed on Sep. 10, 2004.

(51) Int. Cl.
*G06G 7/48* (2006.01)
(52) U.S. Cl. .............................................. 703/10; 702/2
(58) Field of Classification Search ............... 703/10
See application file for complete search history.

(56) References Cited

U.S. PATENT DOCUMENTS

| | | | |
|---|---|---|---|
| 4,821,242 A | 4/1989 | Hennington | 367/53 |
| 4,969,130 A | 11/1990 | Wason et al. | 367/73 |
| 4,991,095 A | 2/1991 | Swanson | 702/16 |

(Continued)

FOREIGN PATENT DOCUMENTS

EP    0 397 313    11/1990

(Continued)

OTHER PUBLICATIONS

Moreton et al, "The Physical Scale Modelling of Braided Alluvial Architecture and Estimation of Subsurface Permeability", Basin Research, vol. 14, pp. 265-285, Sep. 2002.*

(Continued)

*Primary Examiner* — Mary C Jacob
(74) *Attorney, Agent, or Firm* — ExxonMobil Upstream Research Co. Law Dept.

(57) ABSTRACT

A method is disclosed for using a three-dimensional seismic image of a subsurface earth volume to construct a geologic model specifying the spatially-varying grain size distribution, porosity, and permeability throughout the volume. The method applies to earth volumes composed of water-lain clastic sedimentary deposits and involves, in one embodiment, (a) identifying the outline forms of geologic bodies in geologic data; (b) using the outline forms of the geologic bodies to determine the spatially-varying grain size distribution within the bodies, guided by assumptions about the nature and behavior of the paleoflow that deposited the bodies; (c) determining rock properties such as, porosity and permeability within the geologic bodies based on grain-size distribution, mineralogy and burial history information.

21 Claims, 6 Drawing Sheets

U.S. PATENT DOCUMENTS

| | | | | |
|---|---|---|---|---|
| 5,444,619 | A | 8/1995 | Hoskins et al. | 702/13 |
| 5,671,136 | A | 9/1997 | Willhoit, Jr. | 702/18 |
| 5,838,634 | A | 11/1998 | Jones et al. | 367/73 |
| 5,844,564 | A | 12/1998 | Bennis et al. | 345/423 |
| 5,844,799 | A | 12/1998 | Joseph et al. | 703/2 |
| 5,982,706 | A | 11/1999 | Byun | 367/52 |
| 6,044,328 | A | 3/2000 | Murphy et al. | 702/11 |
| 6,106,561 | A | 8/2000 | Farmer | 703/10 |
| 6,205,402 | B1 | 3/2001 | Lazaar et al. | 702/2 |
| 6,236,943 | B1 | 5/2001 | Aminzadeh et al. | 702/16 |
| 6,246,963 | B1 | 6/2001 | Cross et al. | 702/14 |
| 6,374,185 | B1 | 4/2002 | Taner et al. | 702/6 |
| 6,381,543 | B1 | 4/2002 | Guerillot et al. | 702/13 |
| 6,480,790 | B1 | 11/2002 | Calvert et al. | 702/14 |
| 6,529,833 | B2 | 3/2003 | Fanini et al. | 702/7 |
| 6,674,689 | B2 | 1/2004 | Dunn et al. | 367/43 |
| 6,721,661 | B2 | 4/2004 | Anstey et al. | 702/8 |
| 6,823,266 | B2 | 11/2004 | Czernuszenko et al. | 702/14 |
| 6,885,941 | B2 | 4/2005 | Deffenbaugh et al. | 702/2 |
| 7,024,021 | B2 | 4/2006 | Dunn et al. | 382/109 |
| 7,062,383 | B2 | 6/2006 | Deffenbaugh et al. | 702/2 |
| 7,151,845 | B2 | 12/2006 | Hu | 382/109 |
| 7,277,795 | B2 * | 10/2007 | Boitnott | 702/6 |
| 7,340,385 | B2 * | 3/2008 | James | 703/10 |
| 2002/0120429 | A1 | 8/2002 | Ortoleva | 703/2 |
| 2004/0236511 | A1 | 11/2004 | Deffenbaugh et al. | |

FOREIGN PATENT DOCUMENTS

| | | |
|---|---|---|
| WO | WO 01/01350 | 1/2001 |
| WO | WO 2004/083896 | 9/2004 |
| WO | WO 2004/093521 | 11/2004 |
| WO | WO 2005/104002 | 11/2005 |
| WO | WO 2005/104003 | 11/2005 |
| WO | WO 2006/007466 | 1/2006 |
| WO | WO 2006/036389 | 4/2006 |

OTHER PUBLICATIONS

Frantes et al, "Impact of vol. Interpretation & Visualization Technologies on Upstream Business", OTC 13294, Offshore Technology Conference, Houston, Texas, Apr. 10-May 3, 2001.*

Oren et al, "Process Based Reconstruction of Sandstones and Prediction of Transport Properties", Transport in Porous Media, 46, pp. 311-343, 2002.*

Deutsch et al, "FLUVSIM: A Program for Object-Based Stochastic Modeling of Fluvial Depositional Systems", Computers & Geosciences 28, pp. 525-535, 2002.*

Davies et al, "Improved Prediction of Reservoir Behavior Through Integration of Quantitative Geological and Petrophysical Data", SPE 55881, SPE Reservoir Evaluation and Engineering 2, Apr. 1999.*

Xiaoguang et al, "Stochastic Modeling Technique for Heterogeneous Multi-layer Sandstone Reservoir", SPE 64764, SPE International Oil and Gas Conference and Exhibition, Nov. 7-10, 2000.*

Holtz et al, "Reservoir Characterization Methodology to Identify Reserve Growth Potential", SPE 39867, SPE International Petroleum Conference and Exhibition of Mexico, 1998.*

Hoyal et al, "Sedimentation from Jets: A Depositional Model for Clastic Deposits of all Scales and Environments", AAPG Annual Convention, Salt Lake City, Utah, May 11-14, 2003.*

Van Wagoner et al, "Energy Dissipation and the Fundamental Shape of Siliclastic Sedimentary Bodies", Adapted from "extended abstract" of poster session presentation at AAPG Annual Meeting, May 14, 2003..*

EP Standard Search Report No. RS 112050 dtd Mar. 10, 2005 (2 pgs.).

PCT International Search and Written Opinion dtd Mar. 7, 2006 (7 pgs.).

"Brochure for Earth Decision Suite" Earth Decision Sciences Corporation, *gOcad*, 1989-2003.

"Manual for Stratamodel" Landmark Graphics Corporation, *Stratamodel Geocellular Modeling (SGM)*, 1989-2003.

"Brochure for Stratamodel" Zycor a division of Landmark Graphics Corporation, *Stratamodel Geocellular Modeling (SGM)*, 1989-2003.

"Online Brochure for Petrel" Technoguide (A Schlumberger Product Group), *Petrel™ Workflow Tools*, 1996-2003.

*European Search Report*, Application No. 05 790 913.7 dated Apr. 22, 2010.

* cited by examiner

GEOLOGIC MODELS OF SUBSURFACE SEDIMENTARY VOLUMES

CROSS RELATED APPLICATIONS

This application is the National Stage of International Application No. PCT/US2005/29753 filed 19 Aug. 2005, which claims the benefit of U.S. Provisional Patent Application No. 60/609,057 filed on Sep. 10, 2004.

FIELD OF THE INVENTION

This invention relates generally to the field of geologic modeling. Specifically, the invention is a method for constructing a model of geologic properties throughout a subsurface volume.

BACKGROUND OF THE INVENTION

A geologic model is a computer-based representation of a subsurface earth volume, such as a petroleum reservoir or a depositional basin. In the oil and gas industry, geologic models are commonly used in activities such as determining the locations of wells, estimating hydrocarbon reserves, or planning reservoir-development strategies. Geologic models are commonly inputs to production flow simulations that are used to test development and production scenarios in order to optimize return on investment. A key parameter in flow simulation is the spatial distribution of permeability, which together with the properties of the hydrocarbons and other fluid found in the subsurface reservoir, determines the producibility of the reservoir.

The geologic modeling process can use many different data types, including but not limited to rock-property data obtained from wells and seismic data, as well as structural and stratigraphic surfaces that define distinct regions within the model. The goal of the process is to construct a representation of the subsurface that is realistic, accurate, and consistent with the available data types.

Geologic models may take on many different forms. Most commonly, descriptive or static geologic models built for petroleum applications are in the form of a three-dimensional array of model blocks (cells), to which geologic and/or geophysical properties such as lithology, porosity, acoustic impedance, permeability, or water saturation are assigned (such properties will be referred to collectively herein as "rock properties"). The set of cells constitutes the geologic model and represents the subsurface earth volume of interest. Dimensions of the cells are commonly chosen so that the rock properties within a cell are relatively homogeneous without creating an excessive number of cells. The goal of the geologic modeling process is to assign rock properties to each cell in the geologic model so that the resulting model is an accurate representation of the subsurface earth volume of interest.

There are two main ways to populate the discretized geologic volume with properties-geocellular techniques and object-based modeling. In the geocellular approach, geostatistical estimation methods (which may be either deterministic or probabilistic) are commonly used. These methods take into account distance, direction, and spatial continuity of the rock property being modeled. Deterministic estimation methods typically calculate a minimum-variance estimate of the rock property at each block. Probabilistic estimation methods develop distributions of the rock-property values and produce a suite of geologic models for the rock property being modeled, with each model theoretically being equally probable. The spatial continuity of a rock property may be captured by a variogram. A variogram is a well-known technique for quantifying the variability of a rock property as a function of separation distance and direction. Geostatistical models offer several key advantages in that they can utilize a wide range of existing statistical algorithms, readily accommodate data control points such as wells, and are amenable to rock property modeling and optimization using geophysical constraints such as, three-dimensional seismic data. U.S. Pat. Nos. 5,838,634, 6,381,543 and 6,480,790 cover geocellular modeling methods embodied in processing flows which include repetitive optimization steps to drive the geologic model toward conformance with geologic and geophysical data, such as well logs, seismic surveys and subsurface fluid production and pressure data. Most commercial geologic modeling software packages, including PETREL, GOCAD and STRATAMODEL, contain a wide spectrum of geostatistical tools designed to fulfill the requirements of the reservoir geologist or engineer.

The chief drawback to geocellular models is that they generally do not closely replicate structures observed in depositional systems such as rivers, deltas and deep-water canyons and fans. This consideration is significant in that the internal structure of the depositional system may have a significant effect on reservoir quality and continuity.

Object-based geologic models treat subsurface reservoir volumes as assemblages of geologic objects such as channels or depositional lobes. U.S. Pat. No. 6,044,328 discloses one object-based modeling scheme that allows a geologist or reservoir engineer to select geologic objects from an analog library to best match the reservoir being modeled. The appropriateness of the analog is judged by the operator of the process based on their geologic experience. Most commercial software packages, including PETREL, IRAP-RMS and GOCAD implement objects as volumetric elements that mimic channels and lobes using simplified elements based on user-deformable shapes such as half pipes and ellipses.

Object-based modeling is most useful where three-dimensional spatial information such as that provided by three-dimensional seismic volumes is lacking or is of low resolution. The simple shapes provided in existing methods can not readily capture the complex spatial information seen in modern three-dimensional seismic surveys. Furthermore, most of the current techniques emphasize channels and channel complexes as the primary reservoir element. While channelized systems are significant hydrocarbon reservoir types, the identification or modeling of channels is incomplete without accurately characterizing the potentially porous and permeable sands that fill them. The sands themselves are packaged in lobate bodies much like sand bars observable in modern rivers or deltas. It is these bodies which form the bulk of siliciclastic reservoirs. Geologic models that honor and take advantage of these naturally occurring, fundamental elements should produce more accurate subsurface models.

Process-based geologic modeling tools attempt to reproduce subsurface stratigraphy by simulating or approximating the physical processes of sediment transport and deposition, building sedimentary deposits in chronological order. The simulation results can be checked against subsurface data and the simulation rerun using new control variables in an iterative process until approximate correspondence with subsurface data is achieved. U.S. Pat. Nos. 5,844,799, 6,205,402 and 6,246,963 describe three such methods which employ diffusion or rule-based process models to create basin-scale models with limited spatial detail.

Process-based models can typically generate realistic-looking simulated deposits, but they are not commonly used for commercial geologic modeling because it is difficult to adjust the model inputs in such a way as to cause the simulated deposit to honor subsurface data constraints. Unlike geocellular or object-based models, process-based models typically cannot be efficiently optimized by computer algorithms when new static or dynamic data become available. Finally, modern three-dimensional seismic surveys provide a spatial framework for geologic models which is difficult to replicate with process-based models.

From the foregoing, it can be seen that there is a need for a method that honors the shapes and property distributions of naturally occurring sedimentary deposits but can also be easily tied to available seismic and well data. In the above described method, process-based, object-based and geostatistical approaches may be utilized. Preferably, the method may provide an automated optimization process capable of being performed by a computer, resulting in a more accurate model of the subsurface earth volume of interest with minimal additional time and effort. The present invention satisfies this need.

SUMMARY OF THE INVENTION

A method is disclosed for constructing a geologic model which specifies rock properties within a subsurface volume based on seismic data. In this embodiment, (a) outline forms of at least one geologic body within the subsurface volume are identified from seismic data; (b) the grain-size distribution at least one point within a geologic body is estimated from the outline form of the geologic body; (c) rock properties including porosity and permeability are determined using the determined grain size distribution along with mineralogy and burial history information.

A second embodiment of the method for constructing a geologic model which specifies rock properties within a subsurface volume based on seismic data is also disclosed. In this embodiment, (a) outline forms of potential geologic bodies are extracted from geologic data; (b) the outline forms are tested, selecting only those outline forms that likely correspond to sand-prone geologic bodies (c) the size of the outline forms is adjusted to make them substantially consistent with additional constraints on the geologic model such as interval geophysical properties; (d) the spatially-varying grain-size distribution is determined within the outline forms; (e) rock properties are determined within the geologic bodies using the determined grain-size distribution. In addition, the rock properties can be determined using burial history information along with the grain-size distribution.

A third embodiment of the method for constructing a geologic model which specifies rock properties within a subsurface volume based on seismic data is also disclosed. The method comprises: (a) identifying the outline forms of at least one geologic body from the geologic data; (b) estimating the depositing flow field that created at least one geologic body from the outline form; (c) estimating the grain size distribution within at least part of the geologic body using a relationship between the estimated flow field that created the geologic body and the grain-size distribution; (d) estimating rock properties of the sedimentary basin within at least part of the of sedimentary basin based on grain-size distribution.

DETAILED DESCRIPTION

Figure 1:
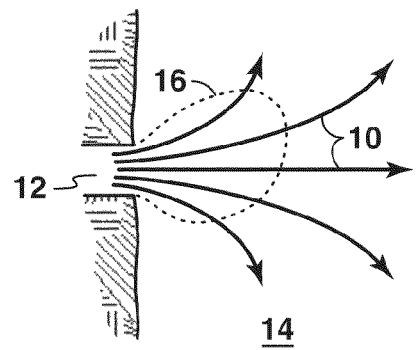
FIG. 1 illustrates the initial stage of deposition of a sedimentary system by a point-source flow.

In the following detailed description, the invention will be described in connection with its preferred embodiment. However, to the extent that the following description is specific to a particular embodiment or a particular use of the invention, this is intended to be illustrative only. Accordingly, the invention is not limited to the specific embodiment described below, but rather, the invention includes all alternatives, modifications, and equivalents falling within the true scope of the appended claims.

The deposition of clastic sedimentary bodies typically begins with a flow of sediment-laden water from a confined channel, such as a river mouth, into an open region where the flow decelerates. The point where the sediment-laden flow is able to expand and decelerate is typically known as the inlet. Initially such flows expand freely and deposit sediment as the flow decelerates. Thereafter, as the deposited sediment grows in height, it begins to obstruct the flow field. Eventually, the deposit becomes sufficiently large that the flow is diverted around the deposit. This results in a new path and inlet for the flow field to an open region beyond or adjacent to the old deposit. The deposition process then repeats, and a second body in the system is created. In addition, more than one such body may be actively built within the system at a time. Overall, the process produces a deposit consisting of stacks of sedimentary bodies, which is a useful model for the structure of hydrocarbon reservoirs.

As will be understood by those skilled in the art, the flow characteristics which create such bodies can be analyzed from Navier-Stokes equations and conservation principles applied to a sediment laden flow beneath stationary clear water that can be entrained, such as turbidity currents in the deep ocean. Such analyses can be extended to flows without vertical entrainment, such as a shallow water layer under air, and these extensions are also within the scope of the present invention. The shape and properties of the depositing flow determines the shape and internal properties of the deposited geologic body. Furthermore, the flow field is related to both the outline form of the deposit and the grain size distribution at all points within the deposit.

Applicants recognized that (a) the outline forms of geologic bodies can be extracted from geologic data such as seismic data volumes; (b) the outline forms of geologic bodies are related to the depositing flow field that created the bodies; (c) the depositing flow field in turn determines the spatially-varying grain size distribution within the body; and (d) the grain-size distribution either singularly or combined with mineralogy and burial history information, determines the rock properties including porosity and permeability at all points within the geologic body. The combination of these observations leads to a method for constructing a geologic model, specifying porosity and permeability throughout a subsurface volume based on a seismic image of the subsurface volume.

Figure 2:
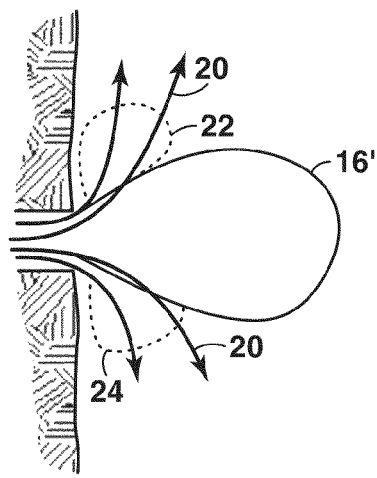
FIG. 2 illustrates a later stage of deposition of the same sedimentary system shown in FIG. 1.
Figure 3:
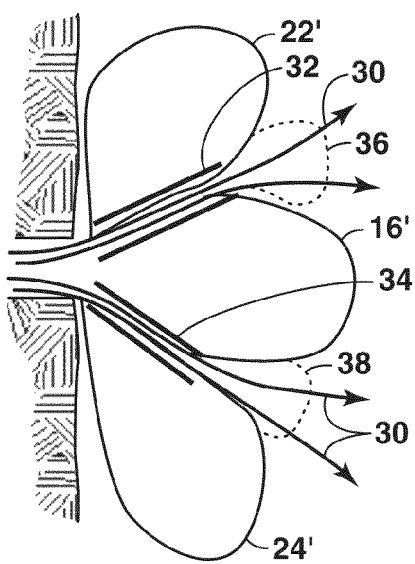
FIG. 3 illustrates an even later stage of deposition of the same sedimentary system shown in FIG. 2.

FIGS. 1, 2, and 3 depict the process of formation of point-source water-lain clastic depositional systems. FIG. 1 shows the earliest stage of deposition, where a sediment-rich flow 10 is emitted from an inlet 12 into an open region 14. As the flow expands and decelerates, it loses its capacity to carry sediment, and deposit 16 is formed beneath the flow.

FIG. 2 shows a later stage in deposition of the system first pictured in FIG. 1. In FIG. 2, deposit 16 from FIG. 1 has become larger and is labeled 16'. Deposit 16' is so large that it now diverts the flow 20. Deposit 16' is no longer building, but the diverted flow is now creating two new deposits, 22 and 24.

FIG. 3 shows a later stage in deposition of the system pictured in FIG. 2. The flow 30, is now confined to channels 32 and 34 which transport it past completed deposits 16', 22' and 24', and is building deposits 36 and 38.

Figure 4:
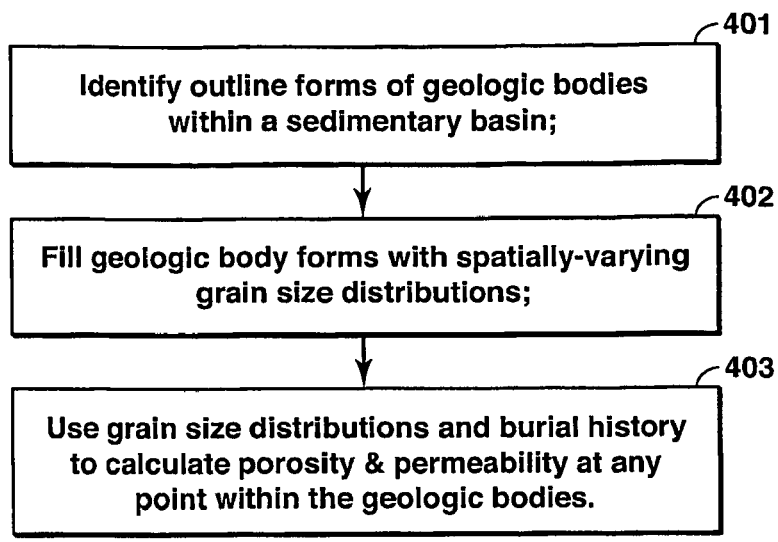
FIG. 4 is a flow chart of an embodiment of the invention.

A first embodiment will now be described. With reference to FIG. 4, this embodiment involves procedures to determine rock properties within a subsurface region using a seismic image of the region. As illustrated in FIG. 4, an outline form of at least one geologic body within the subsurface region is identified (step 401). The grain-size distribution in at least one point within the geologic bodies as identified in step 401 is determined (step 402). Finally, at least one rock property is determined using the grain size distribution found in step 402 (step 403). The rock properties include porosity and permeability. The individual steps will be described in greater detail in the following paragraphs.

Step 401 is identification of outline forms of geologic bodies and can be accomplished by a variety of known methods from geologic data. The geologic data can include but is not limited to seismic data, outcrop data or studies, core samples, reservoir performance data and/or well log data, for example. Seismic data is the preferred data type for determining the outline form of a geologic body. The geologic data can be obtained using many different prior art acquisition method that would be known to persons skilled in the art. This data may be commercially available through seismic or geophysical companies as well as previously acquired data that may be available both in analog or digital form. All such methods of acquiring the geologic data are intended to be within the scope of the claims.

There are three main methods to obtain an outline form of a geologic body from seismic data. The first method is the manual identification of stratigraphic surfaces in the data which define the boundaries of stratigraphic intervals and form the top and bottom boundaries of geologic bodies. Typically, geologists manually identify stratigraphic surfaces by recognizing and identifying seismic reflections as horizons which correlate to changes in rock properties including stratigraphic surfaces. The details of this process are familiar to persons skilled in the art.

A second method is the automated propagation of stratigraphic surfaces, which define the boundaries of stratigraphic intervals. This method is typically performed with a computer extrapolating known or inferred stratigraphic surfaces on the seismic data. Examples include seismic coherency or discontinuity programs. The details of this process are familiar to those persons skilled in the art and are included in commercial applications such as VOXELGEO, GEOFRAME, SEISWORKS3D, and PETREL.

A third method is the automatic identification of stratigraphically realistic geologic bodies as regions having similar seismic attribute values. The preferred embodiment for step 401 is automatic identification of geologic bodies based on the methods described in U.S. Pat. No. 6,674,689 and co-pending U.S. Pat. Nos. 6,823,266 and 7,024,021. These methods allow geologic bodies to be detected and catalogued at finer resolution than is possible with surface-based interpretation methods. Furthermore, these methods allow researchers to extract meaningful stratigraphic information from volumes over a broad spectrum of spatial resolutions using a hierarchical approach that searches these data at multiple scales.

U.S. Pat. No. 7,024,021 discloses a method for performing stratigraphically based seed detection in seismic data that satisfy certain attribute criteria that are stratigraphically plausible. The criteria honor the layered nature of the subsurface so that the resulting seismic objects are stratigraphically reasonable. Seismic objects may be extracted that satisfy the input criteria. Furthermore, this method can accurately determine the size and shape of a specific seismic object by growing the object around a chosen seed point in a seismic data volume. The object is grown by propagating the object to adjacent traces if the adjacent race conforms to the selected criteria.

U.S. Pat. No. 6,823,266 discloses a method for performing object-based connectivity analysis in a three-dimensional data volume. This method provides the ability to predict the connectivity of a seismic object identified by seed detection or similar method. In this method, each identified seismic object can be tracked for changes in its size, spatial position or connections to other seismic objects as function of a chosen threshold value or other user controlled constraint if two or more runs are compared. This allows the operator to pick a threshold connectivity value and track a sedimentary body based on that threshold value.

U.S. Pat. No. 6,674,689 discloses a method for classifying the morphology of seismic objects. In this method, geometric statistics are calculated and used to classify the morphology of the seismic object. Seismically-defined bodies that have shapes and internal attributes indicative of good hydrocarbon reservoir potential (or other element of interest) can be evaluated and extracted from the background of unimportant seismic objects.

In a preferred embodiment, a sedimentary body is extracted by growing the body from a seed point using stratigraphically based seed detection in a seismic data volume. The growth of the body satisfies certain attribute criteria designed to make the body stratigraphically reasonable. The size and shape of a specific seismic object can be accurately determined. Next, an object-based connectivity analysis is performed on the extracted body. The identified seismic object may be tracked for changes in its size, spatial position or connections to other seismic objects as function of a chosen threshold value. Finally, The extracted seismic objects are morphologically classified.

Step 401 can accommodate two-dimensional and three-dimensional data volumes of many types, including but not limited to seismic amplitude (near, far and full stacks), seismic attributes (loop duration, instantaneous amplitude and phase), seismic impedance (band-limited and total) as well as derivative products such as seismic facies and discontinuity data.

Step 402 involves the determination of the grain-size distribution at any point within the geologic bodies. This step can be accomplished by a variety of techniques. Some of the techniques have additional data requirements, and the preferred embodiment for this step depends on the availability of this auxiliary data as well as on the nature of the geologic bodies.

One technique is a method for relating the three-dimensional outline of geologic bodies to the internal grain-size distribution. This method is described in co-pending U.S. Pat. No. 7,062,383. This is the preferred embodiment if fully preserved (not eroded) bodies can be identified from seismic and should be applied if the three-dimensional form of the bodies can be accurately determined. In this method, the internal properties of a water-lain sedimentary body can be determined from the three-dimensional shape of the deposit. One embodiment comprises solving equations relating the identified three-dimensional shape of a sediment body to the flow field that produced the body and using the flow field to solve for the sediment body properties in at least one point within the body.

A second technique is a method for relating the two-dimensional plan view outline or contour of geologic bodies to the internal grain-size distribution. This method is described in co-pending U.S. Pat. No. 6,885,941. The method should be applied if only the two-dimensional shape of the geologic bodies can be accurately determined. Using this method, the properties of a water-lain sedimentary deposit may be predicted at any location from a contour of constant deposit thickness. One embodiment of the method comprises (a) determining an outline of constant deposit thickness in a measured deposit, (b) determining the fluid flow properties at the inlet of the measured deposit, and (c) determining a property of the deposit at any point inside the deposit from modeling the fluid flow.

A third method is a method for relating the thickness of geologic bodies to the internal grain-size distribution. This method is described in PCT Publication No. WO2004/083896. If only remnants of bodies are available or if the bodies extend beyond the area of the seismic data then this method should be applied provided a grain-size distribution measurement is available or can be estimated at one point within each body. This method predicts the grain size distribution at any designated location within a water-lain sedimentary deposit. Initially, the vertical thickness of the sedimentary deposit at the designated location is determined as well as the vertical thickness and grain size distribution at a second location different from the designated location. Second, a distance parameter corresponding to the two locations is determined. Finally, the distance parameter, the vertical thickness at both locations, and the grain size distribution at the second location are used to calculate the grain size distribution at the designated location.

A fourth technique involves determining the properties of geologic bodies penetrated by a well and filling a larger geologic region with synthesized geologic bodies having a similar distribution of properties to those bodies penetrated at the well. This method should be applied when the smallest scale geologic bodies are too small to be visible in seismic data, provided a core sample or other measurement of body thickness and grain size distribution is available. The method for determining the properties of geologic bodies penetrated by a well is described in PCT Publication No. WO2004/093521. This method can determine the properties of a water-lain sediment body from a measurement of grain size distribution and deposit thickness at one location in the body. In one embodiment, the method comprises (a) determining the flow properties at the measured location, (b) extrapolating the flow properties back to the inlet through which the depositing flow was emitted, (c) determining at least one property of the water-lain sediment throughout the sediment body by modeling the flow properties, using the extrapolated flow properties at the inlet from step (b) as a boundary condition. Once the sedimentary body properties in the vicinity of the well are determined, the seismically-defined geologic bodies throughout the system can be filled with smaller bodies having an appropriate statistical distribution of properties as determined from the distribution of properties observed at the well. This method is described in PCT Publication No. WO2005/104033.

A fifth technique involves simulating the fluid flows which produced the bodies and adjusting the boundary conditions of the flow until the simulated deposit outline most nearly resembles the seismically observed deposit outline. A suitable model for this method is disclosed in a co-pending U.S. Provisional Patent Application filed concurrently with the present application titled "a method for evaluating sedimentary properties by numerical modeling of sedimentation processes." A method for evaluating rock properties by numerical modeling of sedimentary processes is disclosed in the application. This technique solves fluid dynamics equations in a control volume scheme to simulate flow physics and deposition. In one embodiment, this numerical modeling technique involves, (a) solving a two-dimensional time-dependent mapview system of equations for at least flow momentum, flow height, suspended sediment concentration, and entrainment of overlying water, (b) calculating net sediment deposition at each mapview location using the flow properties, and (c) recording the time-variability of the net sediment deposition. As computational power increases, these models may have significant predictive capability for modeling the rock properties and potential fluid flow elements in models of hydrocarbon reservoirs.

The preferred method for implementing this fifth technique is in conjunction with hydrodynamics-based gridding (Hydro-Grids) for geologic modeling of the rock properties including grain-size distribution. This method is disclosed in a PCT Publication No. WO2006/007466. In this method, the geologic model cell tops correspond to surfaces of constant time as determined during the numerical modeling. The rock properties of the basin are then represented in this hydrodynamics-based gridding structure.

Step 403 involves the prediction of rock properties within the geologic bodies based on grain-size distribution. This can be accomplished by a variety of methods, including but not limited to the direct calculation of rock properties from grain-size distribution, mineralogy, and burial history. In the absence of grain size data, current geologic modeling methods commonly use cross plots of porosity and permeability data from core plugs grouped by depositional facies to estimate permeability throughout the model. The values and spatial distribution of porosity are usually estimated through geostatistical methods linked to depositional facies analysis from two- or three-dimensional seismic data and well control. Persons skilled in the art of geologic modeling are familiar with these techniques.

A preferred method is described in PCT Publication No. WO2005/104002. This method simulates sandstone deposition, compaction, and cementation. From the determined grain-size distribution, mineralogy and burial history of the deposited grains, the sedimentation, compaction, and cementation of the grains are simulated. Properties of the sandstone such as porosity and permeability may be calculated from the simulation results. The method permits multiple mineralogies to be simulated during the burial history.

Figure 5:
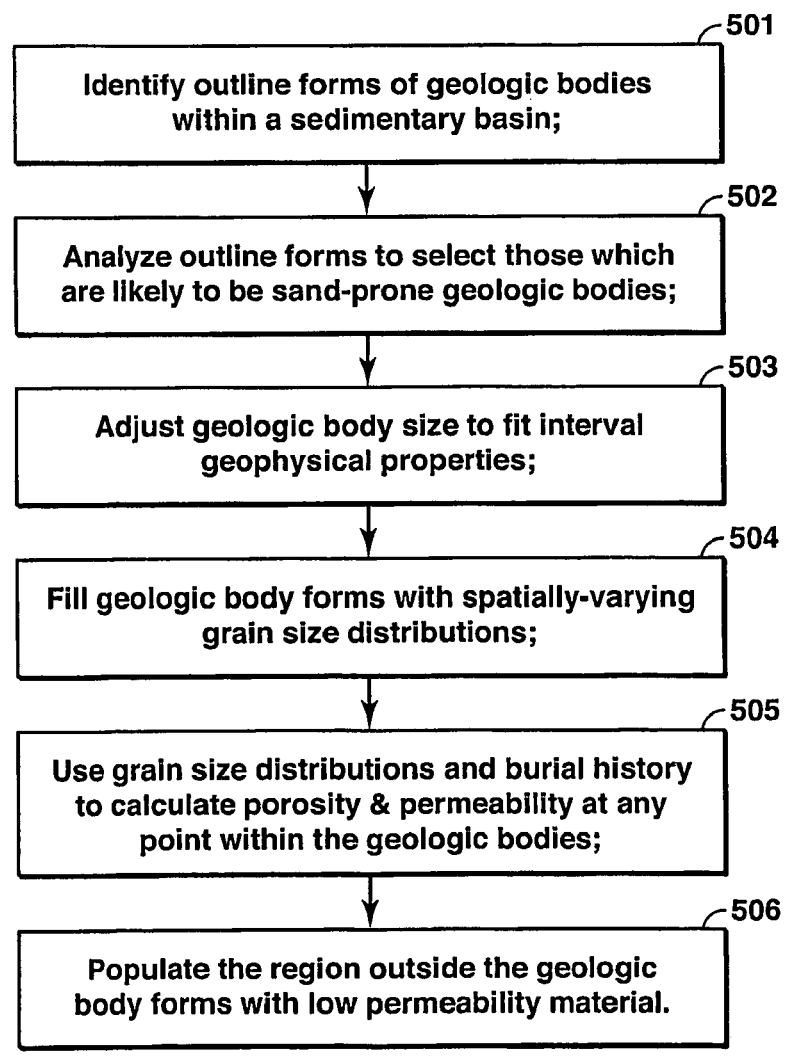
FIG. 5 is a flow chart of a second embodiment of the invention.

A second embodiment will now be described. With reference to FIG. 5, this embodiment involves procedures to determine rock properties within a subsurface region using a seismic image of the region. As illustrated in FIG. 5, outline forms of geologic bodies within the reservoir interval are identified (step 501). Each outline form is evaluated and discarded if it is determined that the form is unlikely to be a sand-prone geologic body (step 502). The outline forms are adjusted in size to make them consistent with additional constraints on the reservoir (step 503). The grain-size distribution at any point within the geologic body forms is determined (step 504). The rock properties are determined using the grain size distribution (step 505). The volume within the reservoir interval that is not associated with a geologic body form is filled with low permeability material (step 506).

Step 501 involves the identification of the outline forms of geologic bodies from geologic data. The methods described in step 401 of FIG. 4 are the same and performed in an equivalent manner in step 501 of FIG. 5. A preferred method is to automatically extract the outline forms of geologic bodies from a three-dimensional seismic data volume.

Step 502 evaluates each extracted outline to determine whether it is a sand-prone geologic body. This is accomplished by seismic attribute methods and through geometric analysis of the morphology of the extracted seismic objects. Those extracted outlines which are not judged to be sand-prone geologic bodies are discarded.

Step 503 is to adjust the size of the sand-prone geologic bodies to tie interval geophysical properties determined from seismic and/or wells. Typically, this step involves altering the body outlines by enlarging or shrinking so that the net-to-gross of the reservoir interval, as estimated from seismic or at wells is substantially equal to the fraction of vertical distance through the interval contained in body outlines. The enlarging or shrinking process can involve adding or removing a constant thickness from the geologic body outline. Alternatively, a constant percentage of thickness can be added or removed at each point. More advanced techniques involve adding or subtracting cells to achieve close matches to sand body shapes known from simulations, studies of outcrops, modern depositional environments, and high resolution three-dimensional seismic volumes. Persons skilled in the art will recognize other methods for adjusting body outlines to match interval geophysical properties.

Step 504 involves the determination of the grain size distribution in at least one point inside a geologic body. The methods described in step 402 of FIG. 4 are the same and performed in an equivalent manner in step 504 of FIG. 5.

Step 505 involves the prediction of rock properties within the geologic body using grain size distribution information from step 504. The preferred embodiment is to use grain size distribution and mineralogy along with burial history to simulate sedimentation, compaction, and cementation of the grains. This simulation can provide an estimate of porosity, permeability, and other rock properties at points where the grain size distribution is known. The methods described in step 403 of FIG. 4 are the same and performed in an equivalent manner in step 505 of FIG. 5.

Step 506 is to fill in the space in the model not included in the geologic body forms with low permeability material. This filling can be accomplished by conventional geostatistical techniques familiar to persons skilled in the art. These low permeability zones may contain thin sand and silts, but they commonly contain significant amounts of detrital clay (very fine-grained particles deposited with the sand or silt grains. This clay often fills the pores between sand grains, reducing porosity and permeability of the sand. The clay may be concentrated in layers ("laminated clay"), or fairly evenly distributed through the sample ("dispersed clay"). In one embodiment, clustering algorithms from Flo-Pac (as described in PCT Publication No. WO2005/104002) are used to distribute clay in our simulated rock. The user defines the amount of clay to be inserted into the rock, size and density of the clay 'clusters', and the mode of distribution (laminated or dispersed). The clay distribution mode, abundance, and cluster density all affect the pore structure, and therefore the flow characteristics, of the sediment. Emplacement or deposition of clay, growth of cement and physical compaction all act to decrease porosity and permeability with increasing burial.

Figure 6:
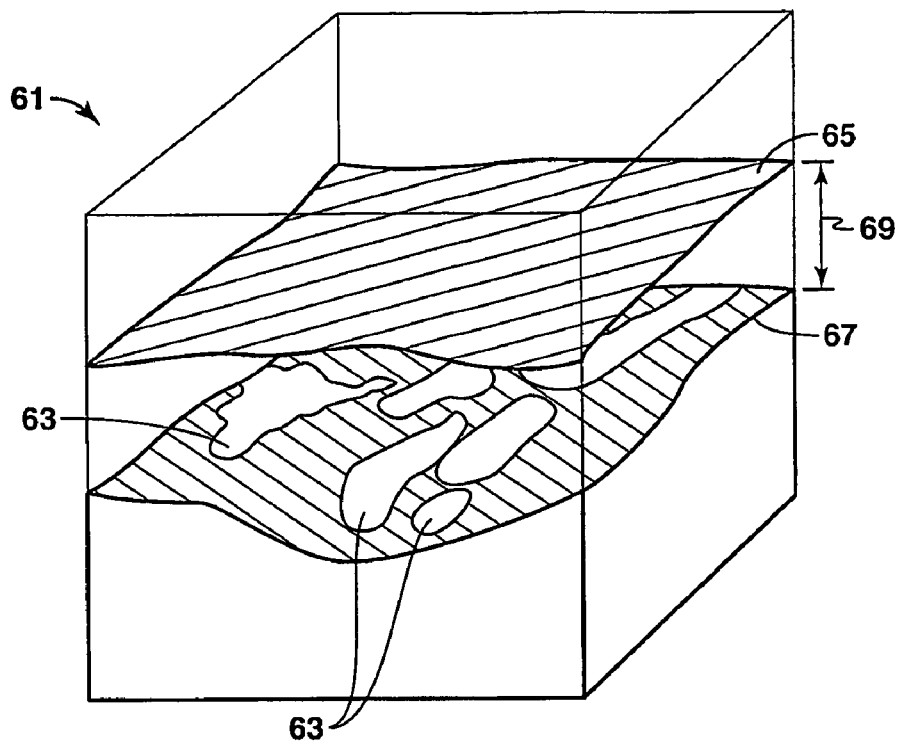
FIG. 6 is a three dimensional view of a seed detected seismic cube.

A hypothetical example will now be discussed. In this example, a seed detection of a seismic cube is performed. FIG. 6 is a three-dimensional view of a seed detected seismic cube 61 showing the individual prospective sand bodies 63 as well as the upper 65 and lower 67 bounding horizons of the reservoir interval 69 as defined by an interpreter.

Figure 7:
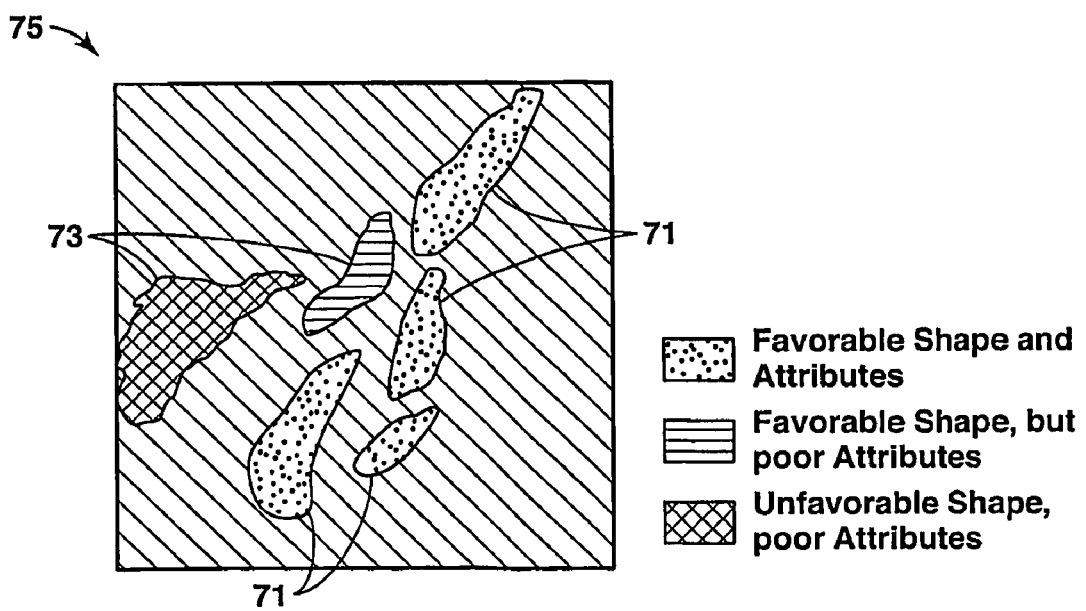
FIG. 7 illustrates a map view of the three dimensional volume illustrated in FIG. 6.

Once the bodies are identified through seed detection, they are classified based on their morphologies and seismic attributes. FIG. 7 illustrates a map view 75 of the three-dimensional volume illustrated in FIG. 6. The sand bodies 63 from FIG. 6 are classified on the basis of their morphologies and their seismic attributes into categories that reflect their relative reservoir potential. Illustrated in FIG. 7 are both sand bodies judged likely to be porous and permeable 71 and sand bodies judged unlikely to be viable reservoir bodies 73 based on morphology and seismic attributes.

Figure 8A:
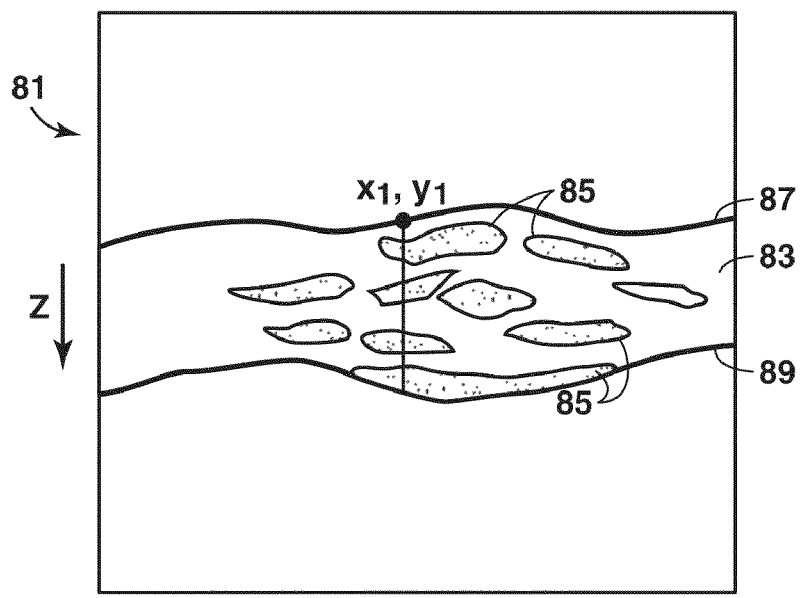
FIG. 8A illustrates a cross sectional and map views of a potential reservoir interval.
Figure 8B:
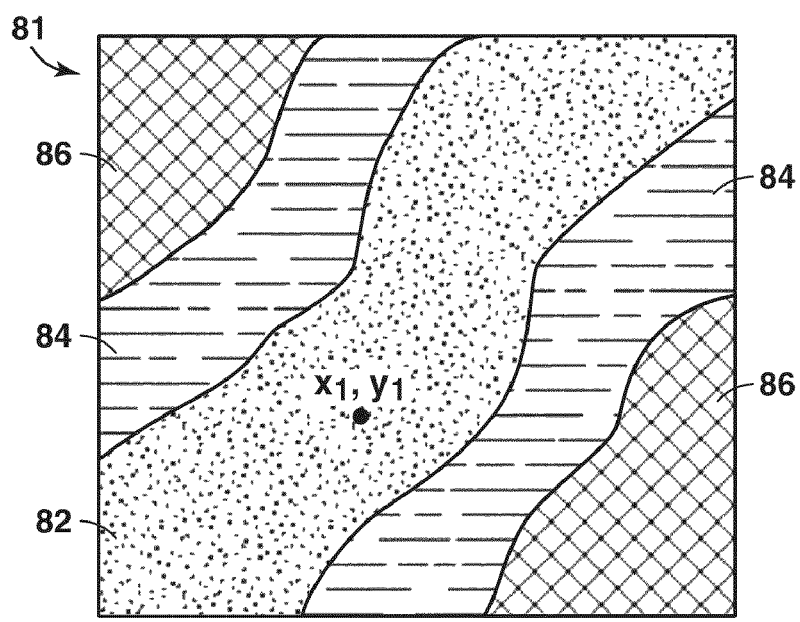
FIG. 8B illustrates a map view of a potential reservoir interval.

In this embodiment, after the morphologies of the bodies are classified, object-based connectivity analysis is performed on the bodies in the three-dimensional data volume. FIGS. 8A and 8B respectively illustrate cross-sectional and map views of a potential reservoir interval 81 as defined by previous steps of this example. FIG. 8A is a cross-sectional view documenting a potential stacking pattern in a hydrocarbon reservoir 83 containing multiple, vertically stacked sand intervals 85 between the top reservoir horizon 87 and the base reservoir horizon 89.

Net reservoir to gross interval ratios (net-to-gross) can be defined at each column of cells in the section and at each point on the map as shown in FIG. 8B. In this illustration there are three ranges of net-to-gross illustrated. The ranges are 30 to 70 percent net-to-gross 82, five to thirty percent net-to-gross 84, and zero to five percent net-to-gross 86. The map gives one possible net-to-gross constraint using polygons to divide the reservoir interval into domains of relative net-to-gross potential. Such a map may be as simple as FIG. 8B where broad polygons define zones of relative reservoir potential, or it may show much more complex distributions. The more complex models of net-to-gross may have spatially-varying patterns derived from trace-by-trace interval attribute measurements from seismic and seismically derived petrophysical volumes. In cases where the assemblage of detected reservoir bodies does not total to the appropriate net-to-gross interval value from the map, the assemblage may be adjusted through iterative modification of the areal extent and vertical thickness of the individual reservoir bodies.

Figure 9:
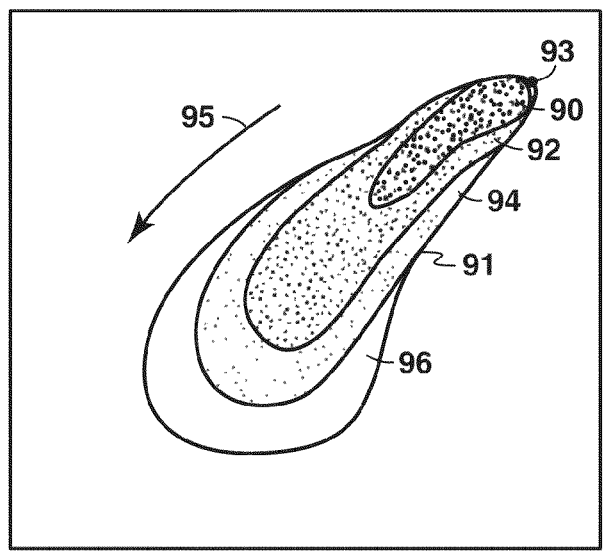
FIG. 9 illustrates a map view of a single potential reservoir sand body which has been populated with estimated grain-size distributions.

Next, the grain-size distributions and related rock properties of the bodies are predicted. FIG. 9 illustrates a map view of a single potential reservoir sand body 91 illustrating the flow inlet 93 and the direction of paleoflow 95 that deposited the sand body. The sand body has been populated with grain-size distributions based on the expected input grain-size and the shape of the body. The grain size distribution carried by the flow at the inlet may be estimated from wells or outcrops in the area of study. The estimated grain-size distributions are generated using one of the algorithms from the suite of shape to grain-size inversion techniques described above for steps 402 and 504 of FIGS. 4 and 5 respectively. In this figure, the grain-size contour ranges include coarse 90, medium 92, fine 94, and very fine 96 sands, but the actual output of the shape— grain size methods is complete grain size distributions at all points in the body.

After inversion, the resulting grain size model is taken to the depth, pressure and temperature regime appropriate for the interval of study. Burial history analysis coupled with knowledge of initial grain mineralogies and grain size distributions may be used to predict the changes of the sediments from burial due to time, pressure and temperature. New simulation techniques such as FloPac (described in PCT Publication No. WO2005/104002) permit detailed simulation of the sedimentation, compaction, cementation and clay filling, calibrated to thin-sections of the sediments.

Figure 10:
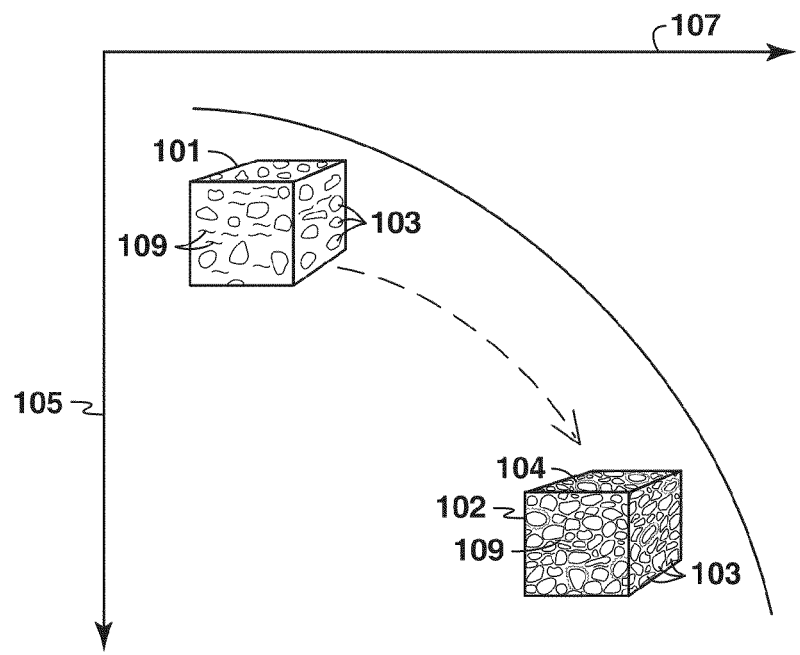
FIG. 10 is a schematic representation of the burial and diagenetic alteration of a sample block of reservoir sediment with increasing burial time, pressure or temperature.

FIG. 10 is a schematic representation of the burial and diagenetic alteration of a sample block 101 of reservoir sediments 103 with increasing burial 105 through time, with concomitant increases in pressure and temperature 107. The initial grain pack block 101 is highly porous and permeable with low density clays 109 and no cement. The final reservoir rock block 102 has reduced porosity and permeability due to mechanical compaction of the sand grains 103 as well as chemical dissolution and precipitation of pore-filling cements 104 and compacted clays 109. This burial history allows detailed estimations of the rock properties throughout the history of the sedimentary basin.

Figure 11:
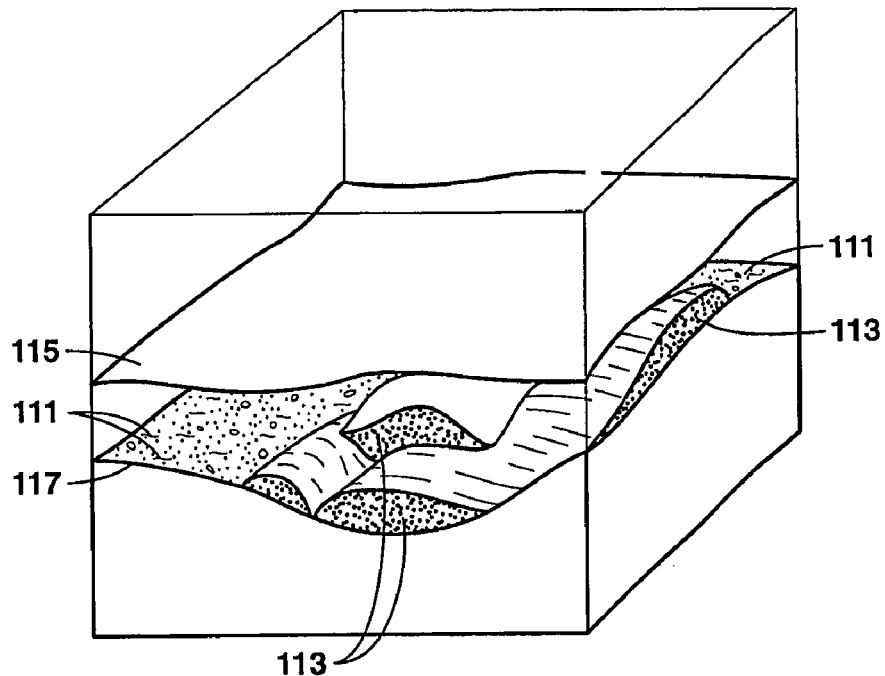
FIG. 11 illustrates a three dimensional view of a reservoir interval where non-reservoir and low quality reservoir material are added to the geologic model.

FIG. 11 gives a three dimension view of the last step in this example work flow where non-reservoir and low quality reservoir material 111 are added to the final geologic model using geostatistical methods calibrated to well and interval geophysical control. Also shown are the sand bodies 113 as well as the reservoir top 115 and reservoir base 117. These techniques provide a detailed model of the reservoir interval and can be used to estimate both rock properties and reservoir production characteristics of the interval. In addition, the techniques described above can be used to predict the properties of the sedimentary basin and not just the reservoir interval as described in this example.

Figure 12:
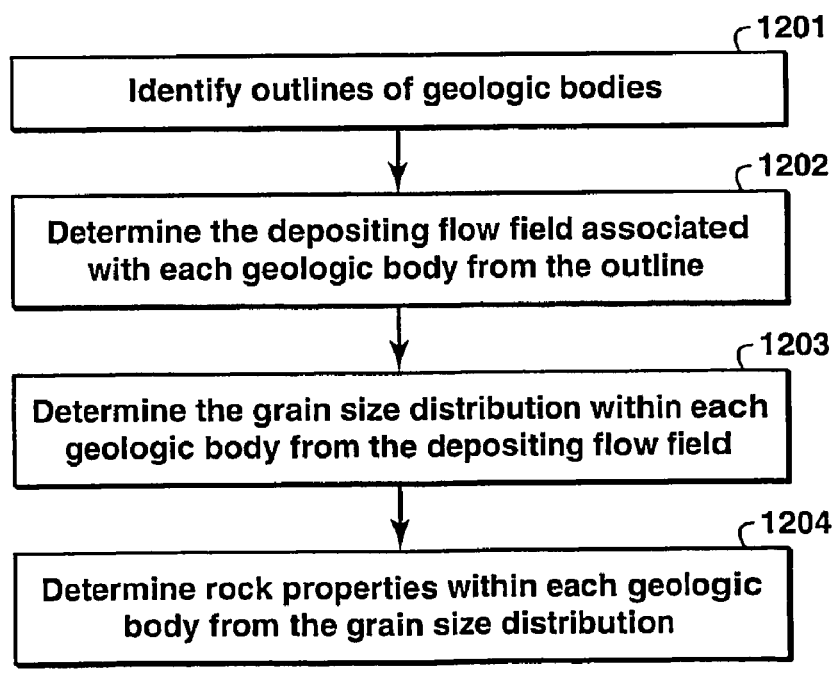
FIG. 12 is a flow chart of a third embodiment of the invention.

In addition to the embodiments described above, a third embodiment is further described in FIG. 12. With reference to FIG. 12, this embodiment involves procedures to determine rock properties within a subsurface region using a seismic image of the region. As illustrated in FIG. 12, an outline form of at least one geologic body within the subsurface region is identified in step 1201. The depositing flow field that created the geologic body is determined from the outline form of the body in step 1202. The grain size distribution within the geologic body is determined using a relationship between the estimated flow field and the deposited grain size distribution in step 1203. Then, rock properties within the geologic body are determined based on the estimated grain size distribution in step 1204.

Step 1201 is the identification of outline forms of geologic bodies and may be accomplished according to a variety of methods, as described in step 401.

Step 1202 involves determining the flow field that deposited the geologic body from the outline form of the body. In one embodiment, this step is accomplished as described in U.S. Pat. No. 7,062,383, which is hereby incorporated by reference, where equations are given relating the three-dimensional shape of a sedimentary body to the flow field which deposited the body. In a second embodiment, this step is accomplished in a manner described in U.S. Pat. No. 6,885, 941, which is hereby incorporated by reference. In that application, the flow properties at an inlet are determined from a two-dimensional map view outline of a geologic body, and the flow field that deposited the body is determined from the inlet flow properties. In a third embodiment, this step is accomplished by simulating the fluid flows which could have produced the body and adjusting the boundary conditions of the flow until the simulated deposit outline most nearly resembles the observed outline from step 1201. A suitable method for simulating such flows is described in PCT Publication No. WO2006/007466, which is hereby incorporated by reference. In these embodiments, the flow properties specified as part of the flow field typically include at least the flow velocity, suspended sediment concentration in the flow, and grain size distribution of the suspended sediment.

Step 1203 involves determining the grain size distribution in the deposit from the flow properties. This determination is made using empirical relationships between the deposited grain size distribution and the flow properties. Appropriate empirical relationships are described in PCT Publication No. WO2006/007466 and U.S. Pat. Nos. 7,062,383 and 6,885, 941, which are referenced above.

Step 1204 involves the prediction of rock properties within the geologic body based on grain size distribution. Methods for making this prediction are described in step 403.

We claim:

1. A method for constructing a geologic model of a subsurface volume, comprising:
    (a) identifying at least one outline form of at least one geologic body within the subsurface volume from geologic data pertaining to a subsurface volume, the at least one geologic body representing a volume of sediment deposited under multiple flow conditions during a single flow event;
    (b) estimating, using a computer, a grain size distribution within at least part of the at least one geologic body using the at least one outline form of the at least one geologic body;
    (c) estimating rock properties of the subsurface volume within at least part of a sedimentary basin based on the grain size distribution.

2. The method of claim 1 wherein the geologic data is seismic data.

3. The method of claim 1 wherein the at least one outline form of the at least one geologic body is identified by a method selected from one of manual identification of stratigraphic surfaces, automated propagation of stratigraphic surfaces, automatic identification of stratigraphically realistic geologic bodies as regions having similar seismic attribute values, and any combination thereof.

4. The method of claim 3 wherein the at least one outline form of the at least one geologic body is identified by automatic identification of stratigraphically realistic geologic bodies by a particular method selected from one of performing stratigraphically based seed detection in seismic data, performing object-based connectivity analysis in seismic data, classifying morphologies of seismic objects and extracting reasonable morphologies, and any combination thereof.

5. The method of claim 1 wherein step (a) further comprises:
    extracting a seismic body from seismic data by growing at least one seismic body from a seed point using stratigraphically based seed detection in a seismic data set,
    performing an object-based connectivity analysis on the at least one extracted body, and
    classifying the at least one extracted body by morphology.

6. The method of claim 1 comprising relating the at least one outline form of at least one geologic body to the grain size distribution is selected from the group consisting of relating a three-dimensional outline of at least one geologic body to an internal grain size distribution, relating a two-dimensional plan view outline of at least one geologic body to the internal grain size distribution, relating thickness of at least one geologic body to the internal grain-size distribution, determining properties of a water-lain sediment body from a measurement of grain size distribution and deposit thickness at one location in the at least one geologic body, filling of seismically defined geologic bodies with smaller bodies having a distribution of properties observed at a well, simulating fluid flows which produced the at least one geologic body while adjusting boundary conditions of the fluid flows until a simulated deposit outline resembles the seismically observed deposit outline, and any combination thereof.

7. The method of claim 1 wherein estimating rock properties of the subsurface volume uses at least the grain size distribution in at least one point within the subsurface volume.

8. The method of claim 1 wherein step (c) further comprises,
  estimating the grain size distribution and mineral composition of grains in sandstone,
  simulating sedimentation of grains from the grain size distribution and mineral composition of the grains,
  simulating compaction of the grains, and
  simulating cementation of the grains.

9. The method of claim 1 wherein step (b) further comprises,
  creating upper and lower grid cell boundaries corresponding to depositional time surfaces determined by simulation of sediment deposition,
  creating side grid cell boundaries, and
  modeling the rock properties of the subsurface volume using grid cells associated with the upper grid cell boundaries, lower grid cell boundaries and side grid cell boundaries.

10. A method for constructing a geologic model of a subsurface volume, the method comprising:
  (a) identifying at least one outline form of a potential geologic body from geologic data pertaining to the subsurface volume;
  (b) selecting from the identified at least one outline form only the at least one outline form likely to correspond to sand-prone geologic bodies;
  (c) adjusting the at least one outline form of the potential geologic body to make the potential geologic body substantially consistent with additional constraints on body properties;
  (d) estimating, using a computer, a grain size distribution within at least a portion of the potential geologic body, guided by the at least one outline form of the potential geologic body;
  (e) estimating rock properties within at least a portion of the potential geologic body based on the grain size distribution.

11. The method of claim 10 further comprising filling at least a portion of a volume within a sedimentary deposit that does not correspond to the sand-prone geologic bodies with low permeability material.

12. The method of claim 10 wherein the geologic data is selected from the group consisting of seismic data, outcrop data, core samples, well logs, and any combination thereof.

13. The method of claim 10 wherein the at least one outline form of the potential geologic body is identified by a method selected from the group consisting of manual identification of stratigraphic surfaces, automated propagation of stratigraphic surfaces, automatic identification of stratigraphically realistic geologic bodies as regions having similar seismic attribute values, and any combination thereof.

14. The method of claim 10 wherein the at least one outline form of the potential geologic body is identified by automatic identification of stratigraphically realistic geologic bodies by a particular method selected from the group consisting of performing stratigraphically based seed detection in seismic data, performing object-based connectivity analysis in seismic data, classifying morphologies of seismic objects and extracting reasonable morphologies, and any combination thereof.

15. The method of claim 10 wherein step (c) is performed by altering the at least one outline form so that net-to-gross of at least one reservoir interval, as estimated from seismic or well data, is substantially equal to a fraction of vertical distance through the at least one reservoir interval contained in body outlines.

16. The method of claim 10 wherein step (d) is implemented using a method selected from the group consisting of relating a three-dimensional outline of the at least one geologic body to an internal grain size distribution, relating a two-dimensional plan view outline of the at least one geologic body to the internal grain size distribution, relating thickness of the at least one geologic body to the internal grain size distribution, determining properties of a water-lain sediment body from a measurement of the grain size distribution and deposit thickness at one location in the sediment body, filling seismically defined geologic bodies with smaller bodies having a distribution of properties observed at a well, simulating fluid flows which produced at least one geologic body while adjusting boundary conditions of the fluid flows until a simulated deposit outline resembles the seismically observed deposit outline, and any combination thereof.

17. The method of claim 10 wherein step (e) further comprises,
  estimating the grain size distribution and mineral composition of grains in sandstone,
  simulating sedimentation of grains from the grain size distribution and mineral composition of the grains,
  simulating compaction of the grains, and
  simulating cementation of the grains.

18. The method of claim 10 wherein step (d) further comprises,
  creating upper and lower grid cell boundaries corresponding to depositional time surfaces determined by simulation of sediment deposition,
  creating side grid cell boundaries; and
  modeling the rock properties of the basin using grid cells associated with the upper grid cell boundaries, lower grid cell boundaries and side grid cell boundaries.

19. A method for constructing a model of a subsurface volume comprising:
  (a) identifying an outline form of at least one geologic body from seismic data pertaining to the subsurface volume;
  (b) estimating, using a computer, a depositing flow field that created the at least one geologic body from the outline form;
  (c) estimating grain size distribution within at least part of the at least one geologic body using a relationship between an estimated flow field that created the at least one geologic body and the grain size distribution;
  (d) estimating rock properties of a sedimentary basin within at least part of the subsurface volume based on the grain size distribution.

20. The method of claim 19 further comprising using mineralogy and burial history information in combination with grain size distribution to estimate the rock properties.

21. The method of claim 19 wherein the estimated depositing flow field comprises spatial variability of at least one of flow velocity, flow height, suspended sediment concentration, suspended sediment grain size distribution and any combination thereof.

* * * * *